US008989938B2

(12) United States Patent
Ando et al.

(10) Patent No.: US 8,989,938 B2
(45) Date of Patent: Mar. 24, 2015

(54) VEHICLE AND VEHICLE CONTROL METHOD

(75) Inventors: Daigo Ando, Nagoya (JP); Takuji Matsubara, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/996,121

(22) PCT Filed: Dec. 22, 2010

(86) PCT No.: PCT/JP2010/073085
§ 371 (c)(1),
(2), (4) Date: Jun. 20, 2013

(87) PCT Pub. No.: WO2012/086022
PCT Pub. Date: Jun. 28, 2012

(65) Prior Publication Data
US 2013/0268153 A1    Oct. 10, 2013

(51) Int. Cl.
*B60L 9/00*  (2006.01)
*B60W 20/00*  (2006.01)
(Continued)

(52) U.S. Cl.
CPC ............ *B60W 20/00* (2013.01); *B60W 10/06* (2013.01); *B60W 10/08* (2013.01); *B60W 30/20* (2013.01); *B60K 6/365* (2013.01); *B60K 6/445* (2013.01); *B60W 20/1084* (2013.01); *B60W 30/18054* (2013.01); *B60W 30/18018* (2013.01); *B60W 2520/04* (2013.01); *Y02T 10/6286* (2013.01);
(Continued)

(58) Field of Classification Search
CPC ..... B60W 10/08; B60W 30/20; B60W 20/00; B60W 10/06; B60W 2600/00; B60W 20/1084; B60W 30/18054; B60W 30/18018; B60W 2520/04; B60W 2510/0642; Y10S 903/93; Y02T 10/6239; Y02T 10/6286; B60K 3/365; B60K 6/445
USPC .................................................. 701/22, 111
See application file for complete search history.

(56) References Cited

U.S. PATENT DOCUMENTS

| 6,054,776 A | 4/2000 | Sumi |
| 6,494,277 B1 | 12/2002 | Boggs et al. |

(Continued)

FOREIGN PATENT DOCUMENTS

| JP | 2001-251704 A | 9/2001 |
| JP | 2002-180863 A | 6/2002 |

(Continued)

*Primary Examiner* — John Q Nguyen
*Assistant Examiner* — Jordan S Fei
(74) *Attorney, Agent, or Firm* — Kenyon & Kenyon LLP (57) ABSTRACT

Provided is a vehicle including an engine, a first MG (motor generator), a second MG, a power split device that couples them, and an ECU. ECU determines whether or not to permit execution of pressing control for suppressing idling vibrations produced by the power split device in an idling state of the engine depending on whether or not the combustion state of the engine is good, and sets a permission flag in accordance with a determination result. ECU determines whether or not the vehicle is stopping and is in the idling state. While the vehicle is stopping and is in the idling state and if the permission flag F is "ON", ECU executes pressing control to cause the first MG to produce pressing torque Tp. If the permission flag F is "OFF", ECU does not execute pressing control so that the first MG does not produce pressing torque Tp.

8 Claims, 7 Drawing Sheets

(51) Int. Cl.
*B60W 10/06* (2006.01)
*B60W 10/08* (2006.01)
*B60W 30/20* (2006.01)
*B60K 6/365* (2007.10)
*B60K 6/445* (2007.10)
*B60W 30/18* (2012.01)

(52) U.S. Cl.
CPC ........... *B60W 2600/00* (2013.01); *Y10S 903/93* (2013.01); *Y02T 10/6239* (2013.01); *B60W 2510/0642* (2013.01)
USPC .............................. 701/22; 701/111; 903/930

(56) References Cited

U.S. PATENT DOCUMENTS

| 6,522,024 | B1 | 2/2003 | Takaoka et al. |
| 2001/0020789 | A1 | 9/2001 | Nakashima |
| 2008/0004780 | A1 | 1/2008 | Watanabe et al. |
| 2011/0231043 | A1* | 9/2011 | Ebuchi et al. .................. 701/22 |

FOREIGN PATENT DOCUMENTS

| JP | 2005-207378 A | 8/2005 |
| JP | 2005-271706 A | 10/2005 |
| JP | 2008-006945 A | 1/2008 |
| JP | 2009-191752 A | 8/2009 |
| JP | 2010-126064 A | 6/2010 |

* cited by examiner

DURING RUNNING IDLING

VEHICLE AND VEHICLE CONTROL METHOD

CROSS REFERENCE TO RELATED APPLICATION

This is a national phase application based on the PCT International Patent Application No. PCT/JP2010/073085 filed on Dec. 22, 2010, the entire contents of which are incorporated herein by reference.

TECHNICAL FIELD

The present invention relates to a vehicle and controlling the vehicle.

BACKGROUND ART

Japanese Patent Laying-Open No. 2008-6945 (PTD 1) discloses, for a hybrid vehicle including an engine and a motor, a technique for causing the motor to produce torque to suppress abnormal noise (rattling noise) produced by a gear mechanism included in a driving device resulting from variations in engine torque.

CITATION LIST

Patent Document

PTD 1: Japanese Patent Laying-Open No. 2008-6945
PTD 2: Japanese Patent Laying-Open No. 2001-251704
PTD 3: Japanese Patent Laying-Open No. 2005-271706
PTD 4: Japanese Patent Laying-Open No. 2002-180863

SUMMARY OF INVENTION

Technical Problem

However, if torque for suppressing abnormal noise is produced by a motor as described in PTD 1, the operating state of the engine may become unstable depending on the combustion state of the engine.

The present invention was made to solve the above-described problem, and has an object to provide a vehicle including an internal combustion engine and a motor coupled to the internal combustion engine via a gear mechanism, wherein suppression of abnormal noise produced by the gear mechanism and stabilization of the operating state of the internal combustion engine are achieved in balance.

Solution to Problem

A vehicle according to the present invention includes an internal combustion engine, a motor coupled to the internal combustion engine via a gear mechanism, and a control device that controls the motor. When the internal combustion engine is in an idling state and when a combustion state of the internal combustion engine is good, the control device causes the motor to produce torque in a direction in which the internal combustion engine is prevented from operating.

Preferably, when the internal combustion engine is in the idling state and when the combustion state is good, the control device makes the torque in the direction in which the internal combustion engine is prevented from operating higher than when the combustion state is not good.

Preferably, when the internal combustion engine is in the idling state and when the combustion state is not good, the control device does not cause the motor to produce the torque in the direction in which the internal combustion engine is prevented from operating.

Preferably, the control device determines whether or not the combustion state is good based on a state of the internal combustion engine while the internal combustion engine is operating, and stores a determination result. When the internal combustion engine is in the idling state while the vehicle is stopping, the control device causes the motor to produce torque in the direction in which the internal combustion engine is prevented from operation if there is no history including a determination that the combustion state is not good, and does not cause the motor to produce the torque in the direction in which the internal combustion engine is prevented from operating if there is a history including the determination that the combustion state is not good.

Preferably, if a rotation speed of the internal combustion engine does not reach a predetermined speed by the time when a predetermined time elapses after startup of the internal combustion engine, the control device determines that the combustion state is not good and stores a determination result.

Preferably, if a rotation speed of the internal combustion engine falls below a predetermined speed while the internal combustion engine is in the idling state with the motor producing no torque, the control device determines that the combustion state is not good and stores a determination result.

Preferably, if the torque of the internal combustion engine falls below predetermined torque while the internal combustion engine is in a load operating state in which torque higher than in the idling state of the internal combustion engine is output, the control device determines that the combustion state is not good and stores a determination result.

A vehicle according to another aspect of the present invention includes an internal combustion engine, a motor coupled to the internal combustion engine via a gear mechanism, and a control device that controls the motor. When the internal combustion engine is in an idling state and when a reference fuel higher in volatility than a heavy fuel is used, the control device causes the motor to produce torque in a direction in which the internal combustion engine is prevented from operating.

Preferably, when the internal combustion engine is in the idling state and when the reference fuel is used, the control device makes the torque in the direction in which the internal combustion engine is prevented from operating higher than when the heavy fuel is used.

Preferably, when the internal combustion engine is in the idling state and when the heavy fuel is used, the control device does not cause the motor to produce the torque in the direction in which the internal combustion engine is prevented from operating.

Advantageous Effects of Invention

The present invention provides a vehicle including an internal combustion engine and a motor coupled to the internal combustion engine via a gear mechanism, wherein suppression of abnormal noise produced by the gear mechanism and stabilization of the operating state of the internal combustion engine can be achieved in balance.

DESCRIPTION OF EMBODIMENTS

Hereinafter, an embodiment of the present invention will be described in detail with reference to the drawings. It is noted that, in the drawings, the same or corresponding portions have the same reference characters allotted, and detailed description thereof will not be repeated.

Figure 1:
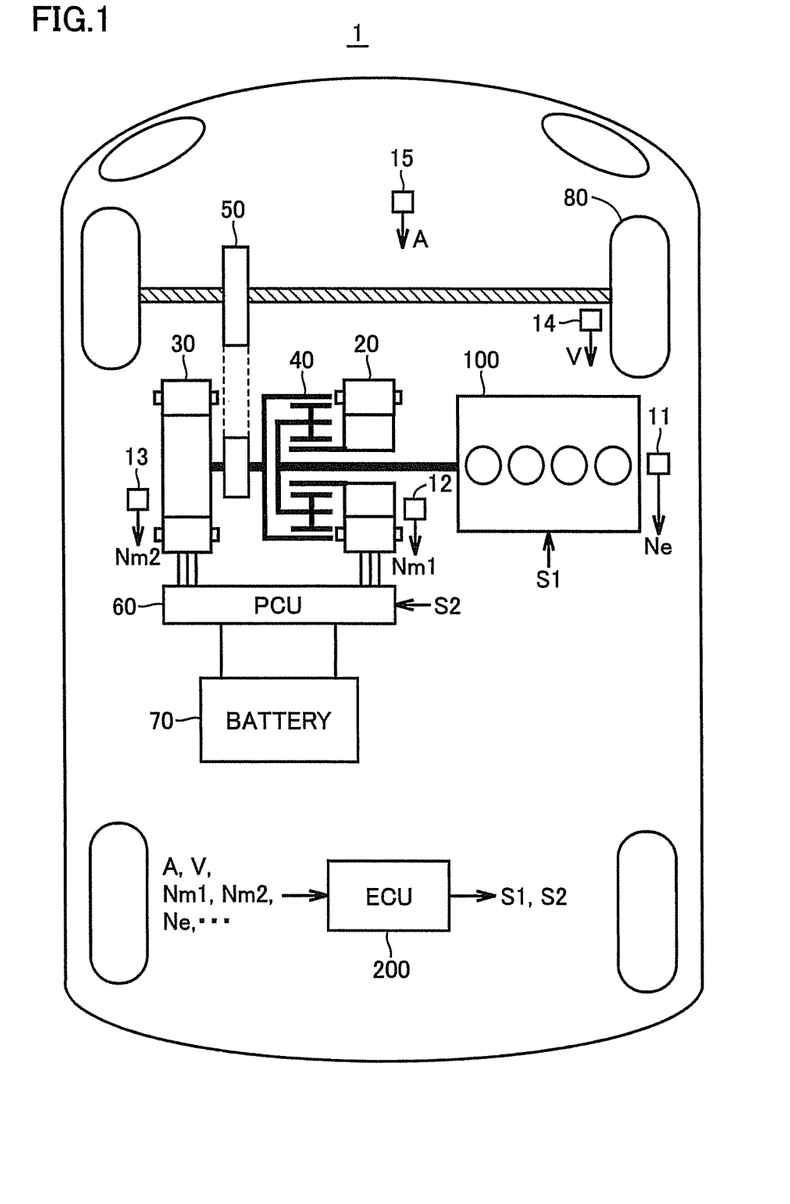
FIG. 1 is an overall block diagram of a vehicle.

FIG. 1 is an overall block diagram of a vehicle 1 according to an embodiment of the present invention. Referring to FIG. 1, this vehicle 1 includes an engine 100, a first MG (Motor Generator) 20, a second MG 30, a power split device 40, a reduction gear 50, a PCU (Power Control Unit) 60, a battery 70, a driven wheel 80, and an ECU (Electronic Control Unit) 200.

Engine 100, first MG 20, and second MG 30 are coupled via power split device 40. This vehicle 1 runs with driving force output from at least one of engine 100 and second MG 30. Motive power produced by engine 100 is split into two paths by power split device 40. That is, one of the paths is for transmission to driven wheel 80 via reduction gear 50, and the other of the paths is for transmission to first MG 20.

Engine 100 is an internal combustion engine controlled by a control signal S1 (in more detail, S1a, S1b, S1c) sent from ECU 200.

Figure 2:
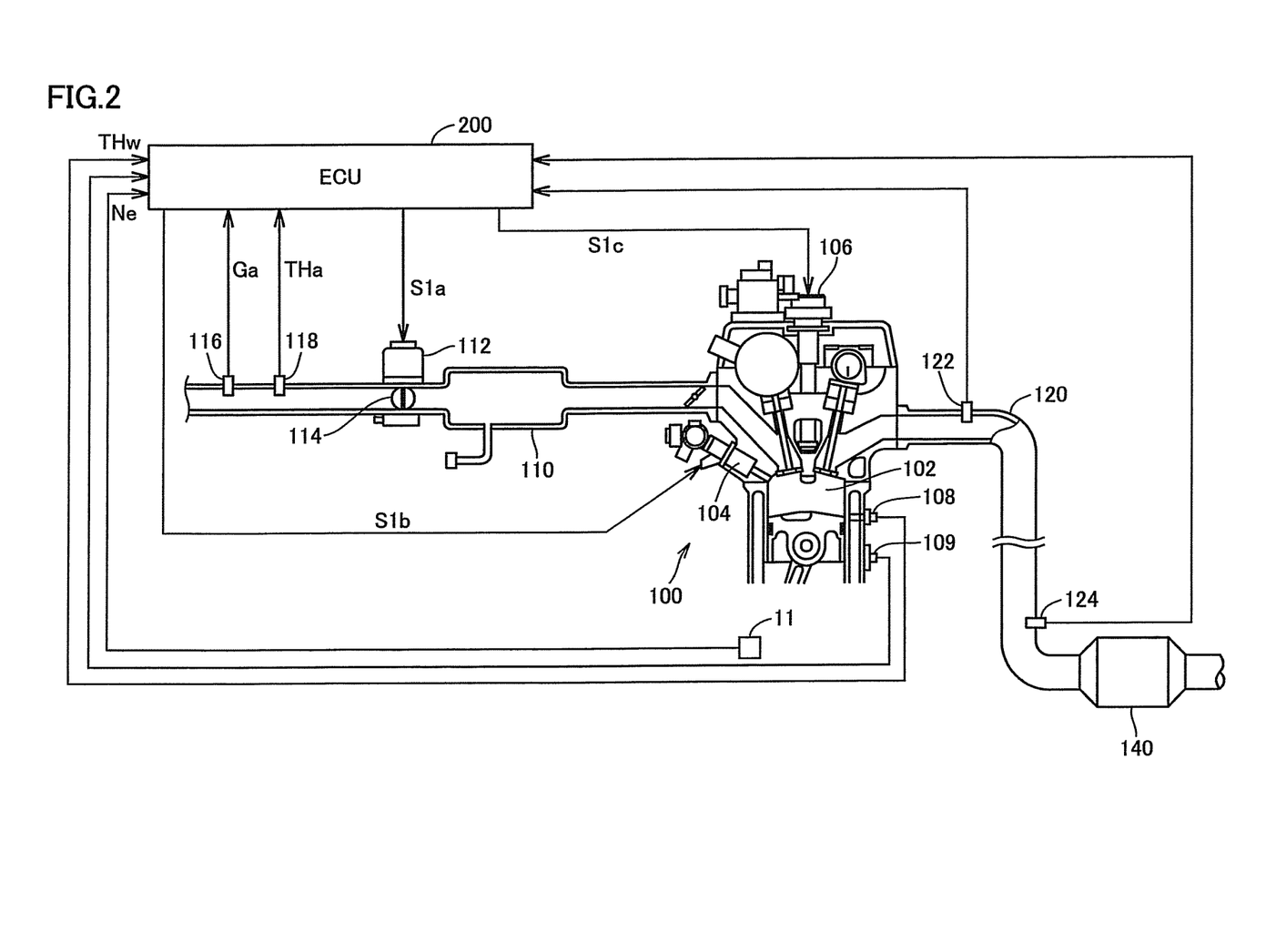
FIG. 2 shows an engine in detail.

FIG. 2 shows engine 100 in detail. It is noted that, although one cylinder is shown in FIG. 2, engine 100 is practically provided with a plurality of cylinders.

In this engine 100, air sucked in through an air cleaner (not shown) circulates through an intake pipe 110 to be introduced into a combustion chamber 102 of engine 100.

A throttle valve 114 is controlled by control signal S1a sent from ECU 200 to adjust the air volume to be introduced into combustion chamber 102. An injector 104 is controlled by control signal S1b sent from ECU 200 to inject fuel stored in a fuel tank (not shown) into combustion chamber 102. It is noted that fuel may be injected by injector 104 into an intake air passage. An ignition coil 106 is controlled by control signal S1c sent from ECU 200 to ignite an air-fuel mixture of air and fuel in combustion chamber 102 to burn the air-fuel mixture.

The exhaust gas generated after combustion of the air-fuel mixture is transferred to an exhaust pipe 120 and cleaned up by a catalyst 140 to be discharged into the atmosphere.

Signals from a rotation speed sensor 11, a water temperature sensor 108, a vibration sensor 109, an airflow meter 116, an air temperature sensor 118, an air-fuel ratio sensor 122, and an oxygen sensor 124 are input into ECU 200.

Rotation speed sensor 11 detects an engine speed (the rotation speed of a crankshaft of engine 100) Ne. Water temperature sensor 108 detects an engine water temperature THw. Vibration sensor 109 detects vibrations of a cylinder block of engine 100. Airflow meter 116 detects an intake air volume (the air volume per unit time sucked into engine 100) Ga. Air temperature sensor 118 detects an intake air temperature THa. Air-fuel ratio sensor 122 detects an air-fuel ratio (the ratio of air mass to fuel mass) A/F in the exhaust gas. Oxygen sensor 124 detects the oxygen concentration in the exhaust gas. Each of these sensors transmits a signal indicating a detection result to ECU 200.

Returning to FIG. 1, each of first MG 20 and second MG 30 is an AC motor and is implemented by a three-phase AC synchronous motor, for example.

Power split device 40 is implemented by a planetary gear including a sun gear, a pinion gear, a carrier, and a ring gear. The pinion gear is engaged with the sun gear and the ring gear. The carrier rotatably supports the pinion gear, and is coupled to the crankshaft of engine 100. The sun gear is coupled to a rotation shaft of first MG 20. The ring gear is coupled to a rotation shaft of second MG 30 and reduction gear 50. In this way, engine 100, first MG 20, and second MG 30 are coupled via power split device 40 implemented by the planetary gear. Thus, engine speed Ne, a first MG rotation speed (the rotation speed of the rotation shaft of first MG 20) Nm1, and a second MG rotation speed (the rotation speed of the rotation shaft of second MG 30) Nm2 will have a relationship connected by a straight line in a nomographic chart, as shown in FIGS. 3 to 6 which will be described later.

PCU 60 converts DC power stored in battery 70 into AC power that can drive first MG 20 and second MG 30 for output to first MG 20 and/or second MG 30. First MG 20 and/or second MG 30 are thereby driven by electric power stored in battery 70. PCU 60 also converts AC power generated by first MG 20 and/or second MG 30 into DC power that can charge battery 70 for output to battery 70. Battery 70 is thereby charged with electric power generated by first MG 20 and/or second MG 30.

Battery 70 is a DC power source that stores electric power for driving first MG 20 and/or second MG 30, and is implemented by, for example, a nickel-metal hydride, lithium ion or similar secondary battery. Battery 70 has a voltage of about 200 V, for example. It is noted that a large-capacity capacitor can also be employed as battery 70.

In addition to the respective sensors (rotation speed sensor 11, etc.) that detect the state of engine 100 described above, resolvers 12, 13, a vehicle speed sensor 14, an accelerator position sensor 15, and the like are connected to ECU 200.

Resolver 12 detects first MG rotation speed Nm1. Resolver 13 detects second MG rotation speed Nm2. Vehicle speed sensor 14 detects a vehicular speed V from the rotation speed of the drive shaft. Accelerator position sensor 15 detects a degree of operation A of the accelerator pedal made by a user. Each of these sensors transmits a signal indicating a detection result to ECU 200.

ECU 200 includes a CPU (Central Processing Unit) and a memory, neither shown, and is configured to execute predetermined arithmetic processing based on information stored in the memory or information sent from each sensor.

ECU 200 controls engine 100, first MG 20, and second MG 30 depending on the state of vehicle 1. It is noted that torque of engine 100 will be referred to as "engine torque Te", torque of first MG 20 as "first MG torque Tm1", and torque of second MG 30 as "second MG torque Tm2."

Each of FIGS. 3 to 6 shows the states of engine 100, first MG 20, and second MG 30 controlled by ECU 200 on a nomographic chart. It is noted that, as described above, engine speed Ne, first MG rotation speed Nm1, and second MG rotation speed Nm2 have a relationship connected by a straight line in the nomographic chart.

Figure 3:
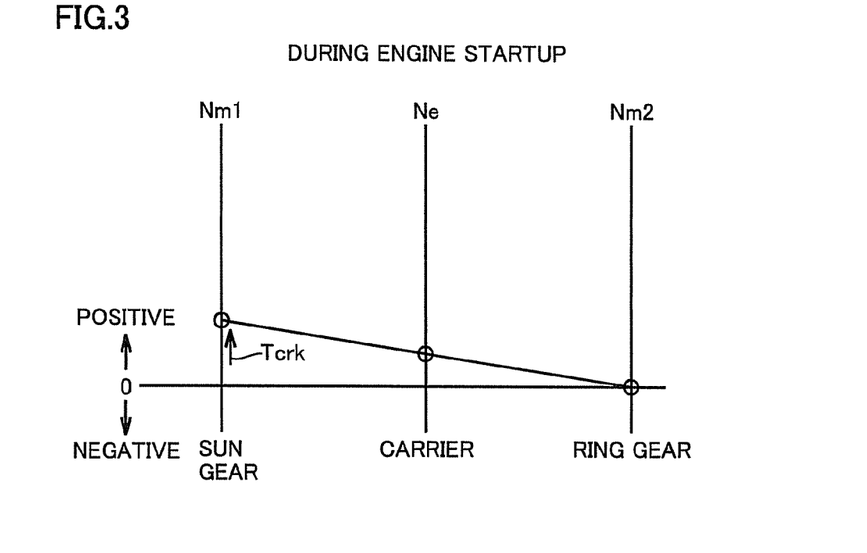
FIG. 3 is a nomographic chart during engine startup.

FIG. 3 shows a nomographic chart during startup of engine 100. It is noted that FIG. 3 shows the case where engine 100 is started when the vehicle is stopping (when Nm2=0).

When starting engine 100, ECU 200 first uses first MG 20 to crank up engine 100. That is, ECU 200 causes first MG 20 to produce cranking torque Tcrk, as shown in FIG. 3 (set Tm1=Tcrk). Then, ECU 200 performs ignition by ignition coil 106 when engine speed Ne rises to a predetermined speed by cranking torque Tcrk. When combustion of the air-fuel mixture by this ignition (so-called first cycle) is performed, engine 100 is started, and engine speed Ne is further increased by torque produced by engine 100. It is noted that, if engine speed Ne is lower than a threshold value N0 even after ignition, ECU 200 determines that the first cycle has not been performed and causes cranking torque Tcrk to be produced continuously.

Figure 4:
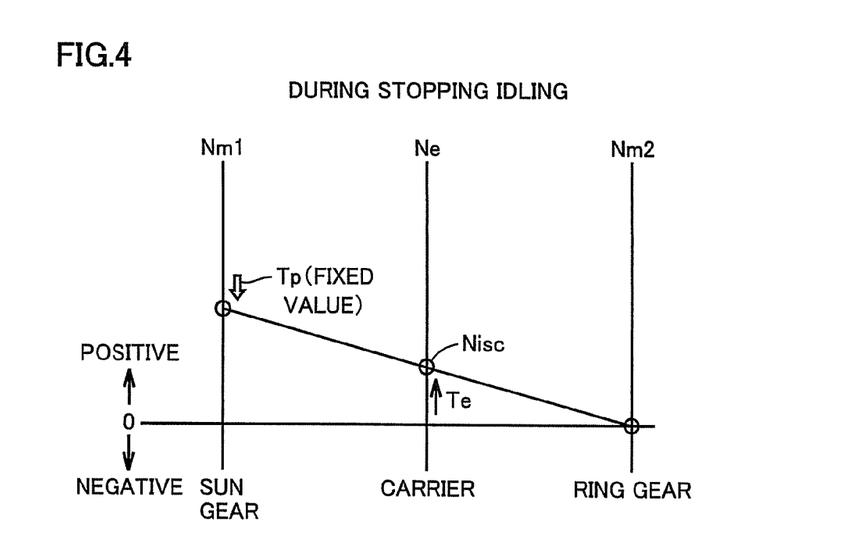
FIG. 4 is a nomographic chart during stopping idling.

FIG. 4 shows a nomographic chart during stopping idling (when engine 100 is controlled to be in the idling state while the vehicle is stopping). It is noted that the "idling state" as used in the present embodiment shall refer to the state where engine 100 is operating at low loads (including no-load) and low speeds. During stopping idling, ECU 200 executes control for feedback control of engine torque Te (in more detail, the degree of operation of throttle valve 114) such that engine speed Ne approaches a target idle rotation speed Nisc (this control will hereinafter be called "ISC control" (ISC: Idle Speed Control)).

On this occasion, if first MG 20 is brought into a free state (where torque is not produced), the gears constituting power split device 40 come into contact irregularly to cause vibrations of relatively low frequency (hereinafter also called "idling vibrations") since there are backlashes (plays) left between the gears constituting power split device 40. Abnormal noise resulting from the idling vibrations may give a user relatively great discomfort while the vehicle is stopping with no running noise produced.

To suppress the idling vibrations, ECU 200 causes first MG 20 to produce torque (hereinafter called "pressing torque Tp") for maintaining the gears constituting power split device 40 in a state pressed to come into contact with one another, as shown in FIG. 4 (set Tm1=Tp). The degree of pressing torque Tp is previously determined by an experiment or the like such that idling vibrations can be suppressed. Therefore, the degree of pressing torque Tp is fixed at a constant value irrespective of engine torque Te and engine speed Ne. The direction of pressing torque Tp is a direction in which engine 100 is prevented from operating (the negative direction shown in FIG. 4). The control of causing first MG 20 to produce pressing torque Tp will hereinafter be called "pressing control." The pressing control will be described later in more detail.

Figure 5:
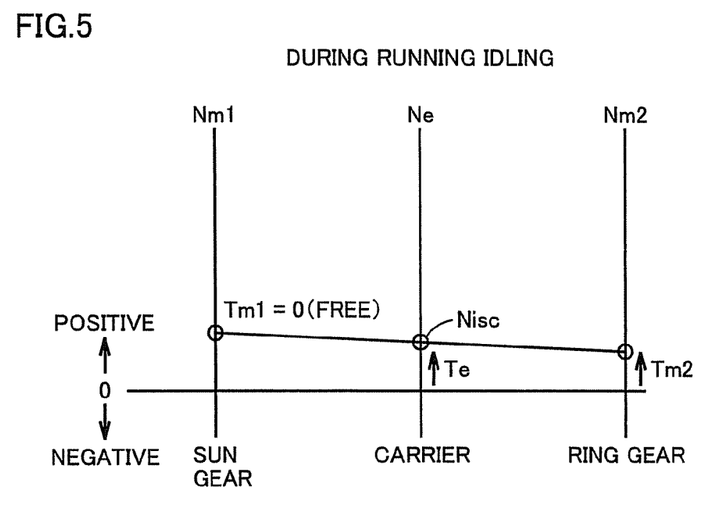
FIG. 5 is a nomographic chart during running idling.

FIG. 5 shows a nomographic chart during running idling (when engine 100 is controlled to be in the idling state while the vehicle is running). During running idling, ECU 200 also executes the above-described ISC control. Accordingly, idling vibrations may occur similarly to the case where the vehicle is stopping, however, the idling vibrations give the user relatively smaller discomfort since running noise and the like also occur while the vehicle is running. Therefore, during running idling, ECU 200 does not execute the pressing control and brings first MG 20 into the free state, as shown in FIG. 5 (set Tm1=0).

Figure 6:
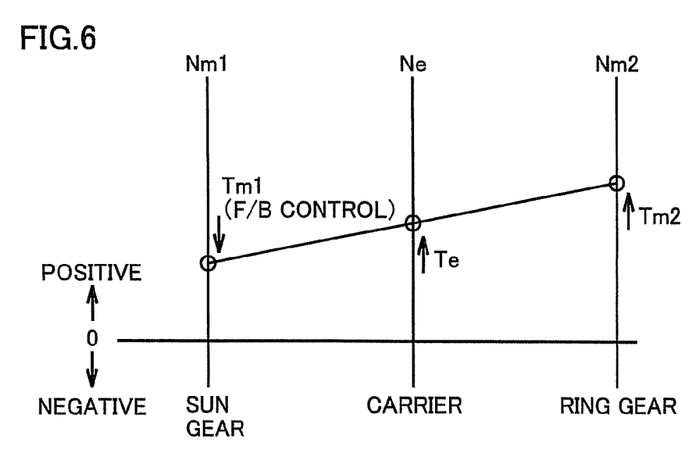
FIG. 6 is a nomographic chart during load operation.

FIG. 6 shows a nomographic chart during load operation (when engine 100 is controlled to be in a load operating state where output is higher than in the idling state). During load operation, ECU 200 controls engine torque Te and second MG torque Tm2 so as to satisfy torque requested by the user. On this occasion, ECU 200 carries out feedback control on first MG torque Tm1 such that first MG torque Tm1 serves as a reaction force of engine torque Te and second MG torque Tm2. Therefore, during load operation, first MG torque Tm1 is controlled variably depending on engine torque Te and second MG torque Tm2.

As described above, in the present embodiment, engine 100, first MG 20, and second MG 30 are controlled depending on the state of vehicle 1. Particularly during stopping idling, the pressing control is executed to cause first MG 20 to produce pressing torque Tp. Thus, idling vibrations are suppressed.

However, as shown in FIG. 4, pressing torque Tp acts in the direction in which engine 100 is prevented from operating (the negative direction shown in FIG. 4). Therefore, if pressing torque Tp is produced even in the case where the air-fuel mixture is difficult to burn and sufficient engine torque Te cannot be ensured, the operating state of engine 100 may become unstable, which may lead to engine stall.

Then, ECU 200 previously determines whether or not the combustion state of engine 100 is good. During stopping idling and when the determination result indicates that the combustion state is good, ECU 200 executes the pressing control. When the determination result indicates that the combustion state is not good, ECU 200 does not execute the pressing control. This is the most characteristic point of the present invention.

Figure 7:
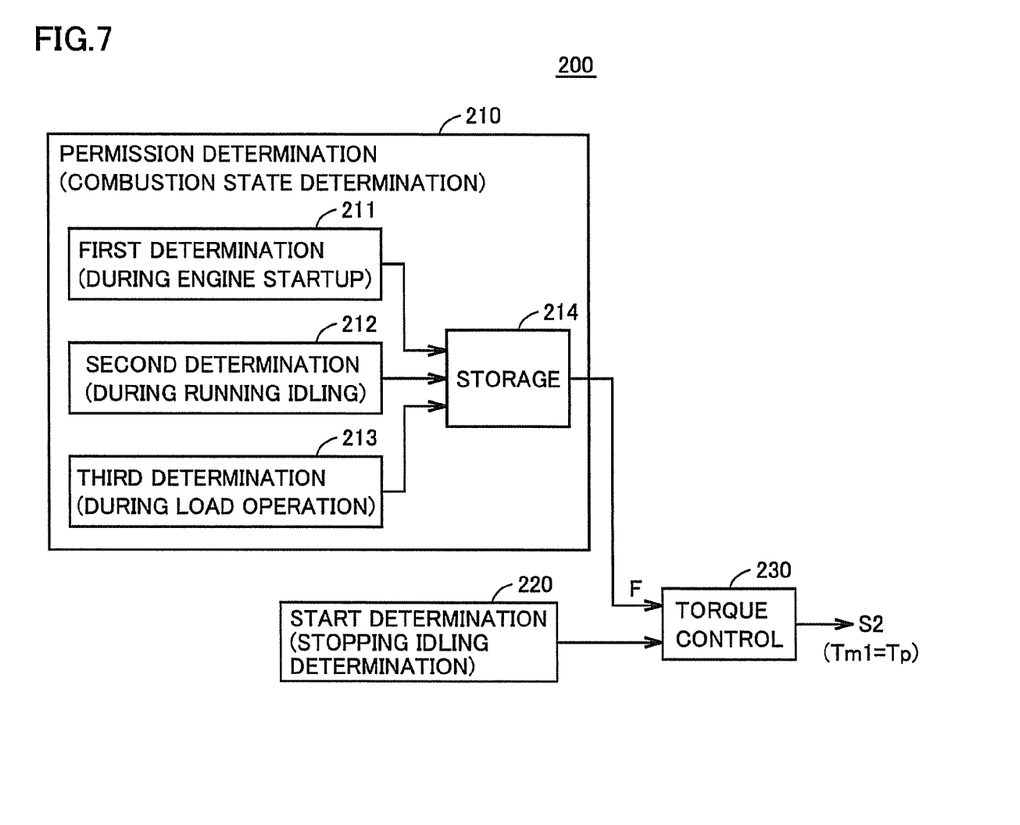
FIG. 7 is a functional block diagram of ECU.

FIG. 7 is a functional block diagram of ECU 200 for units related to the pressing control. Each functional block shown in FIG. 7 may be implemented by hardware or software.

ECU 200 includes a permission determination unit 210, a start determination unit 220, and a torque control unit 230.

Permission determination unit 210 determines whether or not to permit execution of the pressing control depending on whether or not the combustion state of engine 100 is good.

Permission determination unit 210 includes a first determination unit 211, a second determination unit 212, a third determination unit 213, and a storage unit 214. First to third determination units 211, 212, 213 all determine whether or not to permit execution of the pressing control depending on whether or not the combustion state is good, however, they differ in determination timing and determination method.

First determination unit 211 determines whether or not to permit execution of the pressing control based on the combustion state during engine startup. A specific determination method will be described later.

Second determination unit 212 determines whether or not to permit execution of the pressing control based on the combustion state during running idling. A specific determination method will be described later.

Third determination unit 213 determines whether or not to permit execution of the pressing control based on the combustion state during load operation. A specific determination method will be described later.

The history of determination results of each of first to third determination units 211, 212, 213 is stored in storage unit 214. Specifically, storage unit 214 stores a "permission flag F" indicating whether or not to permit execution of the pressing control. When permission flag F is "ON", it is indicated that execution of the pressing control is permitted. When permission flag F is "OFF", it is indicated that execution of the pressing control is not permitted (forbidden).

Each of first to third determination units 211, 212, 213 sets permission flag F stored in storage unit 214 at "ON" when it is determined that the combustion state is good, and sets permission flag F stored in storage unit 214 at "OFF" when it is determined that the combustion state is not good (getting worse).

It is noted that the case where the combustion state is not good includes the case where the combustion state is unstable and the case where the air-fuel mixture does not burn even if it is ignited. Such a phenomenon appears markedly when a heavy fuel lower in volatility than a reference fuel serving as the reference in determining control specifications of engine 100 is used. Therefore, the determination result (permission flag F) made by first to third determination units 211, 212, 213 also corresponds to what indicating the property of the fuel used (either the reference fuel or the heavy fuel).

Start determination unit 220 determines whether or not the start condition of the pressing control has been satisfied, specifically, whether it is the case where vehicle 1 is stopping and engine 100 is controlled to be in the idling state, and outputs a determination result to torque control unit 230.

When the start condition of the pressing control has been satisfied, torque control unit 230 reads permission flag F stored in storage unit 214. When permission flag F is "ON", torque control unit 230 executes the pressing control to cause first MG 20 to produce pressing torque Tp. When permission flag F is "OFF", torque control unit 230 does not execute the pressing control so that first MG 20 does not produce pressing torque Tp.

Figure 8:
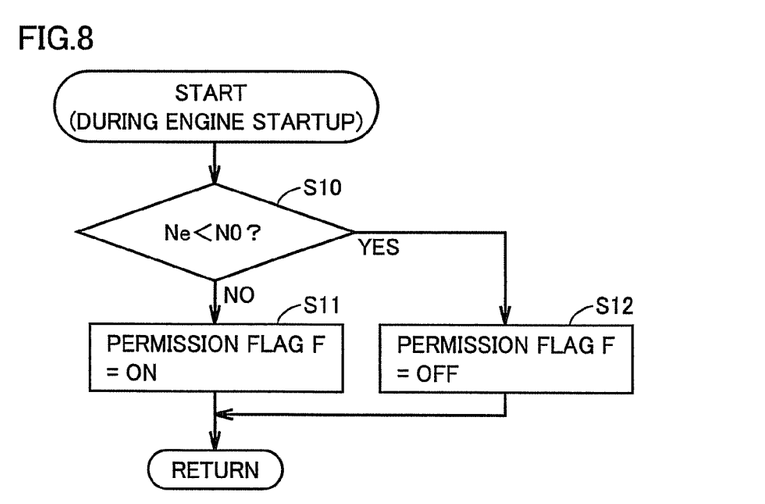
FIG. 8 is a (first) flowchart showing a procedure of ECU.

FIG. 8 is a flowchart showing a procedure of ECU 200 for achieving the function of above-described first determination unit 211. This flowchart is started at engine startup.

At S10, ECU 200 determines whether or not the state where engine speed Ne is lower than threshold value N0 has continued by the time when a predetermined time elapses after engine startup. This threshold value N0 is set at a value for determining whether the first cycle has been performed by the time when the predetermined time elapses after engine startup.

Figure 9:
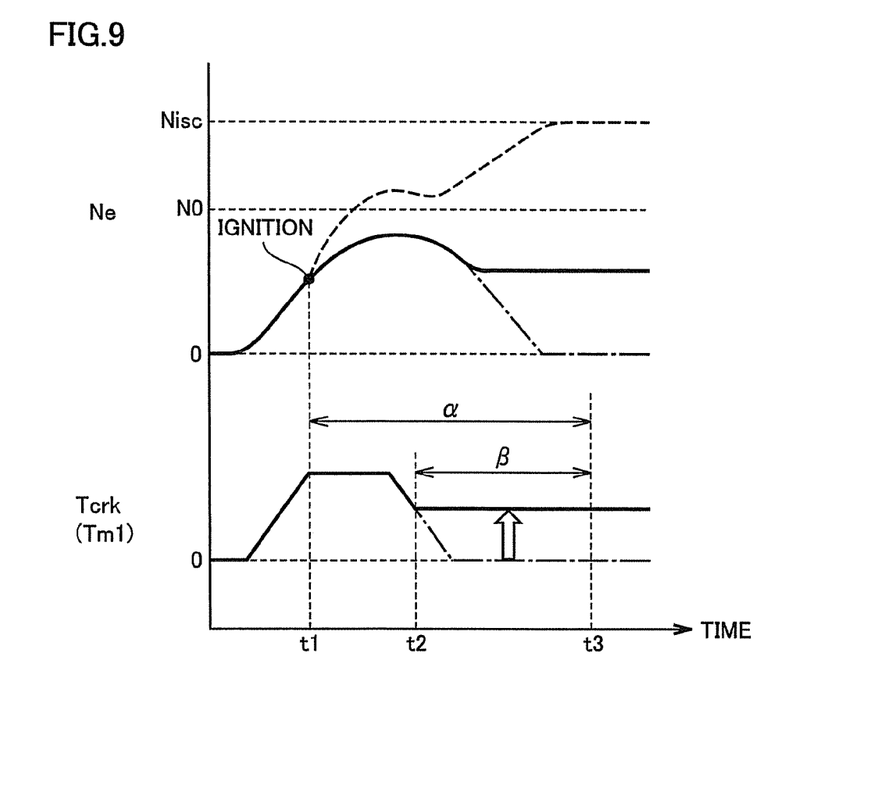
FIG. 9 shows changes in engine speed Ne and cranking torque Tcrk.

FIG. 9 shows changes in engine speed Ne and cranking torque Tcrk during engine startup. At time t1 when engine speed Ne has reached a predetermined speed by cranking torque Tcrk, ignition by ignition coil 106 is performed. When a first cycle is carried out by this ignition, engine speed Ne increases beyond threshold value N0. On the other hand, when the first cycle has not been carried out, engine speed Ne does not exceed threshold value N0. When cranking torque Tcrk is returned to zero, engine speed Ne also drops to zero (see the dash-dot line of FIG. 9). Therefore, after time t2, ECU 200 causes cranking torque Tcrk to be continuously produced so as to support engine speed Ne such that engine speed Ne does not drop (this control will hereinafter also be called "support control"). The "predetermined time" used for the determination at S10 is set at a period a including a period β of this support control. It is noted that it may be determined at S10 whether execution of the support control is present or absent.

Returning to FIG. 8, if engine speed Ne becomes higher than threshold value N0 (NO at S10), ECU 200 determines that the combustion state is good (the first cycle has been performed) and sets permission flag F at "ON" at S11. On the other hand, if the state where engine speed Ne is lower than threshold value N0 is continuing (YES at S10), ECU 200 determines that the combustion state is not good (the first cycle has not been performed) and sets permission flag F at "OFF" at S12.

Figure 10:
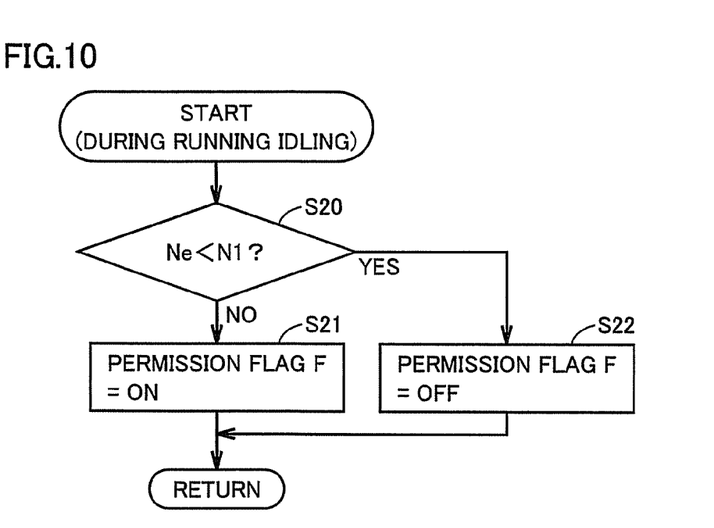
FIG. 10 is a (second) flowchart showing a procedure of ECU.

FIG. 10 is a flowchart showing a procedure of ECU 200 for achieving the function of above-described second determination unit 212. This flowchart is repeatedly executed in a predetermined cycle during running idling.

At S20, ECU 200 determines whether or not engine speed Ne is lower than a reference speed N1. Reference speed N1 is set at target idle rotation speed Nisc, for example.

If engine speed Ne is higher than reference speed N1 (NO at S20), ECU 200 determines that the combustion state is good and sets permission flag F at "ON" at S21. On the other hand, if engine speed Ne is lower than reference speed N1 (YES at S20), ECU 200 determines that the combustion state is not good and sets permission flag F at "OFF" at S22.

Figure 11:
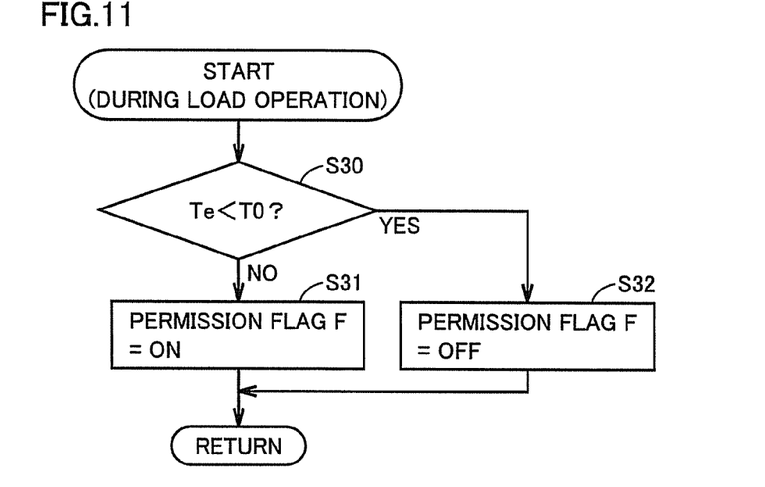
FIG. 11 is a (third) flowchart showing a procedure of ECU.

FIG. 11 is a flowchart showing a procedure of ECU 200 for achieving the function of above-described third determination unit 213. This flowchart is repeatedly executed in a predetermined cycle during load operation.

At S30, ECU 200 determines whether or not engine torque Te is lower than reference torque T0. Engine torque Te may be estimated from Tm1 and Tm2, for example. That is, during load operation, Tm1 is controlled to be at a value serving as the reaction force of Te and Tm2, as already described. Therefore, engine torque Te can be estimated from Tm1 and Tm2. Tm1 and Tm2 can be estimated from detection results made by resolvers 12, 13 or the like. Reference torque T0 may be set using the value of engine torque Te at the time of good combustion as a reference. For example, the correspondence between Tm1, Tm2 and engine torque Te at the time of good combustion may be previously obtained based on result of experiments or the like and stored, and the correspondence may be used to set reference torque T0 corresponding to actual Tm1 and Tm2.

If engine torque Te is higher than reference torque T0 (NO at S30), ECU 200 determines that the combustion state is good and sets permission flag F at "ON" at S31. On the other hand, if engine torque Te is lower than reference torque T0 (YES at S30), ECU 200 determines that the combustion state is not good and sets permission flag F at "OFF" at S32.

Figure 12:
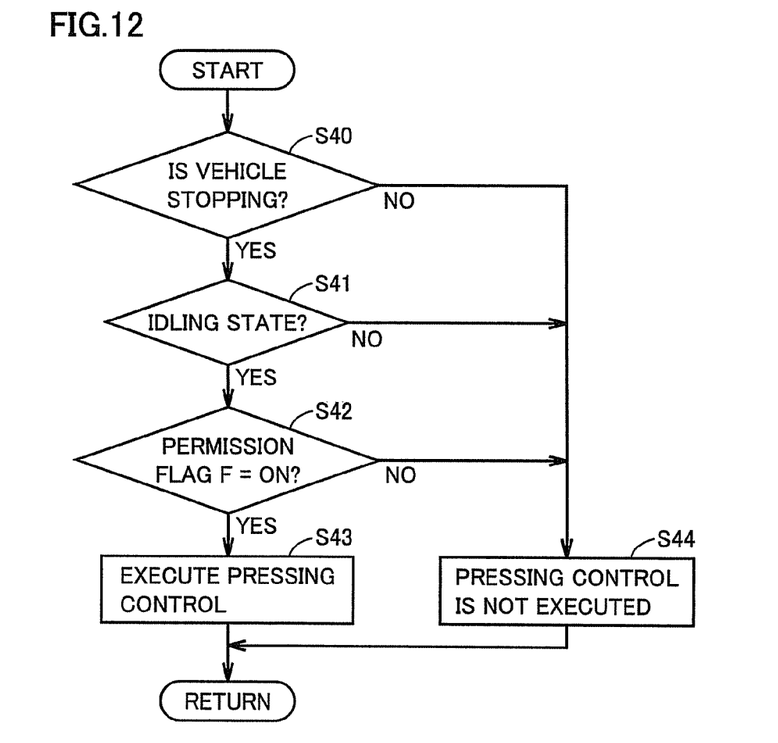
FIG. 12 is a (fourth) flowchart showing a procedure of ECU.

FIG. 12 is a flowchart showing a procedure of ECU 200 for achieving the functions of above-described start determination unit 220 and torque control unit 230. This flowchart is repeatedly executed in a predetermined cycle while engine 100 is operating.

At S41, ECU 200 determines whether or not the vehicle is stopping. At S42, ECU 200 determines whether or not engine 100 is in the idling state. At S43, ECU 200 determines whether or not permission flag F is "ON."

During stopping idling and when permission flag F is ON (YES at all of S41 to S43), ECU 200 executes the pressing control to cause first MG 20 to produce pressing torque Tp. Idling vibrations can thereby be suppressed.

On the other hand, while the vehicle is running (NO at S40), or while engine 100 is in load operation (NO at S41), or when permission flag F is OFF (NO at S43), ECU 200 does not execute pressing control so that first MG 20 does not produce pressing torque Tp. That is, if it has been determined that the combustion state is not good, ECU 200 forbids execution of the pressing control even during stopping idling. The operating state of engine 100 can thereby be stabilized (engine stall is avoided).

As described above, vehicle 1 according to the present embodiment previously determines whether or not the combustion state of engine 100 is good, and permits execution of the pressing control during stopping idling when the combustion state is good, and forbids execution of the pressing control during stopping idling when the combustion state is not good. Accordingly, suppression of abnormal noise resulting from idle vibrations and stabilization of the operating state of engine 100 (avoidance of engine stall) can be achieved in balance depending on the combustion state of engine 100 (depending on the property of the fuel used).

It is noted that the present embodiment can also be modified as follows, for example.

While vehicle 1 according to the present embodiment includes two motor generators (first MG 20 and second MG 30), it may be a vehicle including one or three motor generators. While vehicle 1 according to the present embodiment does not include a clutch in a driveline, it may be a vehicle including a clutch in the driveline.

In the present embodiment, execution of the pressing control is forbidden when the combustion state of engine 100 is not good, however, the present invention is not limited to forbiddance of execution of the pressing control. For example, pressing torque Tp when the combustion state is not good may be made lower than pressing torque Tp when the combustion state is good (in other words, pressing torque Tp when the combustion state is good may be made higher than pressing torque Tp when the combustion state is not good).

Adjustment of the degree of pressing torque Tp can be achieved by controlling the output of first MG 20, but it is not necessarily limited as such. For example, when a clutch is provided between first MG 20 and power split device 40, the degree of pressing torque Tp may be adjusted by changing the slide of the clutch.

It should be understood that the embodiment disclosed herein is illustrative and not limitative in any respect. The scope of the present invention is defined by the claims, rather than the description above, and is intended to include any modifications within the scope and meaning equivalent to the claims.

REFERENCE SIGNS LIST 1 vehicle; 11 rotation speed sensor; 12,13 resolver; 14 vehicle speed sensor; 15 accelerator position sensor; 20 first MG; 30 second MG; 40 power split device; 50 reduction gear; 70 battery; 80 driven wheel; 100 engine; 102 combustion chamber; 104 injector; 106 ignition coil; 108 water temperature sensor; 109 vibration sensor; 110 intake pipe; 114 throttle valve; 116 airflow meter; 118 air temperature sensor; 120 exhaust pipe; 122 air-fuel ratio sensor; 124 oxygen sensor; 140 catalyst; 200 ECU; 210 permission determination unit; 211 first determination unit; 212 second determination unit; 213 third determination unit; 214 storage unit; 220 start determination unit; 230 torque control unit.

The invention claimed is:

1. A vehicle comprising:
an internal combustion engine;
a first motor;
a second motor;
a driven wheel;
a planetary gear mechanism including a sun gear coupled to said first motor, a ring gear coupled to said second motor and coupled to said driven wheel via a reduction gear, a pinion gear engaged with said sun gear and said ring gear, and a carrier coupled to said internal combustion engine and rotatably supporting said pinion gear; and
a control device that controls said first motor, wherein
said control device determines whether or not a combustion state of said internal combustion engine is good based on whether or not a rotation speed or torque of said internal combustion engine falls below a predetermined value,
when said internal combustion engine is in an idling state and when a combustion state of said internal combustion engine is good, said control device causes said first motor to produce torque in a direction in which said internal combustion engine is prevented from rotating, and
when said internal combustion engine is in an idling state and when said combustion state is not good, said control device causes said first motor to produce a torque in the direction in which said internal combustion engine is prevented from rotating, said torque being smaller than when said combustion state is good.

2. The vehicle according to claim 1, wherein when said internal combustion engine is in the idling state and when said combustion state is not good, said control device does not cause said first motor to produce the torque in the direction in which said internal combustion engine is prevented from rotating.

3. The vehicle according to claim 2, wherein
said control device determines whether or not said combustion state is good while said internal combustion engine is operating, and stores a determination result, and
when said internal combustion engine is in the idling state while said vehicle is stopping, said control device causes said first motor to produce the torque in the direction in which said internal combustion engine is prevented from rotating if there is no history including a determination that said combustion state is not good, and does not cause said first motor to produce the torque in the direction in which said internal combustion engine is prevented from rotating if there is a history including the determination that said combustion state is not good.

4. The vehicle according to claim 3, wherein if a rotation speed of said internal combustion engine does not reach a predetermined speed by the time when a predetermined time elapses after startup of said internal combustion engine, said control device determines that said combustion state is not good and stores a determination result.

5. The vehicle according to claim 3, wherein if a rotation speed of said internal combustion engine falls below a predetermined speed while said internal combustion engine is in the idling state with said motor producing no torque, said control device determines that said combustion state is not good and stores a determination result.

6. The vehicle according to claim 3, wherein if the torque of said internal combustion engine falls below predetermined torque while said internal combustion engine is in a load operating state in which torque higher than in the idling state of said internal combustion engine is output, said control device determines that said combustion state is not good and stores a determination result.

7. A vehicle comprising:
an internal combustion engine;
a first motor;
a second motor;
a driven wheel;
a planetary gear mechanism including a sun gear coupled to said first motor, a ring gear coupled to said second motor and coupled to said driven wheel via a reduction gear, a pinion gear engaged with said sun gear and said ring gear, and a carrier coupled to said internal combustion engine and rotatably supporting said pinion gear; and
a control device that controls said first motor, wherein
when said internal combustion engine is in an idling state and when a reference fuel higher in volatility than a heavy fuel is used, said control device causes said first motor to produce torque in a direction in which said internal combustion engine is prevented from rotating, and
when said internal combustion engine is in an idling state and when said heavy fuel is used, said control device causes said first motor to produce a torque in the direction in which said internal combustion engine is prevented from rotating, said torque being smaller than when said reference fuel is used.

8. The vehicle according to claim 7, wherein when said internal combustion engine is in the idling state and when said heavy fuel is used, said control device does not cause said first motor to produce the torque in the direction in which said internal combustion engine is prevented from rotating.

* * * * *